United States Patent [19]

Mishima

[11] Patent Number: 5,051,818
[45] Date of Patent: Sep. 24, 1991

[54] VIDEO SIGNAL PROCESSING APPARATUS

[75] Inventor: Hidetoshi Mishima, Nagaokakyo, Japan

[73] Assignee: Mitsubishi Denki Kabushiki Kaisha, Tokyo, Japan

[21] Appl. No.: 430,415

[22] Filed: Nov. 2, 1989

[30] Foreign Application Priority Data

Nov. 4, 1988 [JP] Japan .................. 63-279570

[51] Int. Cl.$^5$ .............................................. H04N 9/78
[52] U.S. Cl. ...................................................... 358/31
[58] Field of Search ........................................... 358/31

[56] References Cited

U.S. PATENT DOCUMENTS

| 4,141,035 | 2/1979 | Maxemchuk et al. | 358/31 |
| 4,489,346 | 12/1984 | Tanaka et al. | 358/31 |
| 4,707,732 | 11/1987 | Matono | 358/31 |

FOREIGN PATENT DOCUMENTS

| 217649 | 4/1987 | European Pat. Off. . | |
| 322890 | 7/1989 | European Pat. Off. . | |
| 111596 | 7/1983 | Japan | 358/31 |
| 58-129890 | 8/1983 | Japan . | |
| 658 | 2/1984 | PCT Int'l Appl. | 358/31 |
| 2173668 | 10/1986 | United Kingdom | 358/31 |
| 2204209 | 11/1988 | United Kingdom . | |

OTHER PUBLICATIONS

Takahiko Fukinuke, "Digital Signal Processing of Images", pp. 109–110, published Jul. 15, 1985 by Nikkan Kogyo Newspapers Publishing Co., Ltd.

*Primary Examiner*—John W. Shepperd

[57] ABSTRACT

A video signal processing device comprises a synthesizing circuit for synthesizing three signals delayed a unitary time with respect to each other, a detecting circuit for detecting correlations of these three signals, and an output circuit for selecting and outputting, on the basis of a result of detection of the correlations, two signals each indicative of an average value of the signals neighboring in terms of time and a signal which may exist intermediate the length of time. The correlation detecting circuit is operable to detect two of the three signals delayed a predetermined time T from each other, which have a closer correlation with each other. The output signal selecting circuit is operable in response to the result of detection performed by the correlation detecting circuit to output the signal indicative of the average value of these two signals having the closer correlation with each other, or the signal existing at the center of the length of time between these two signals.

6 Claims, 12 Drawing Sheets

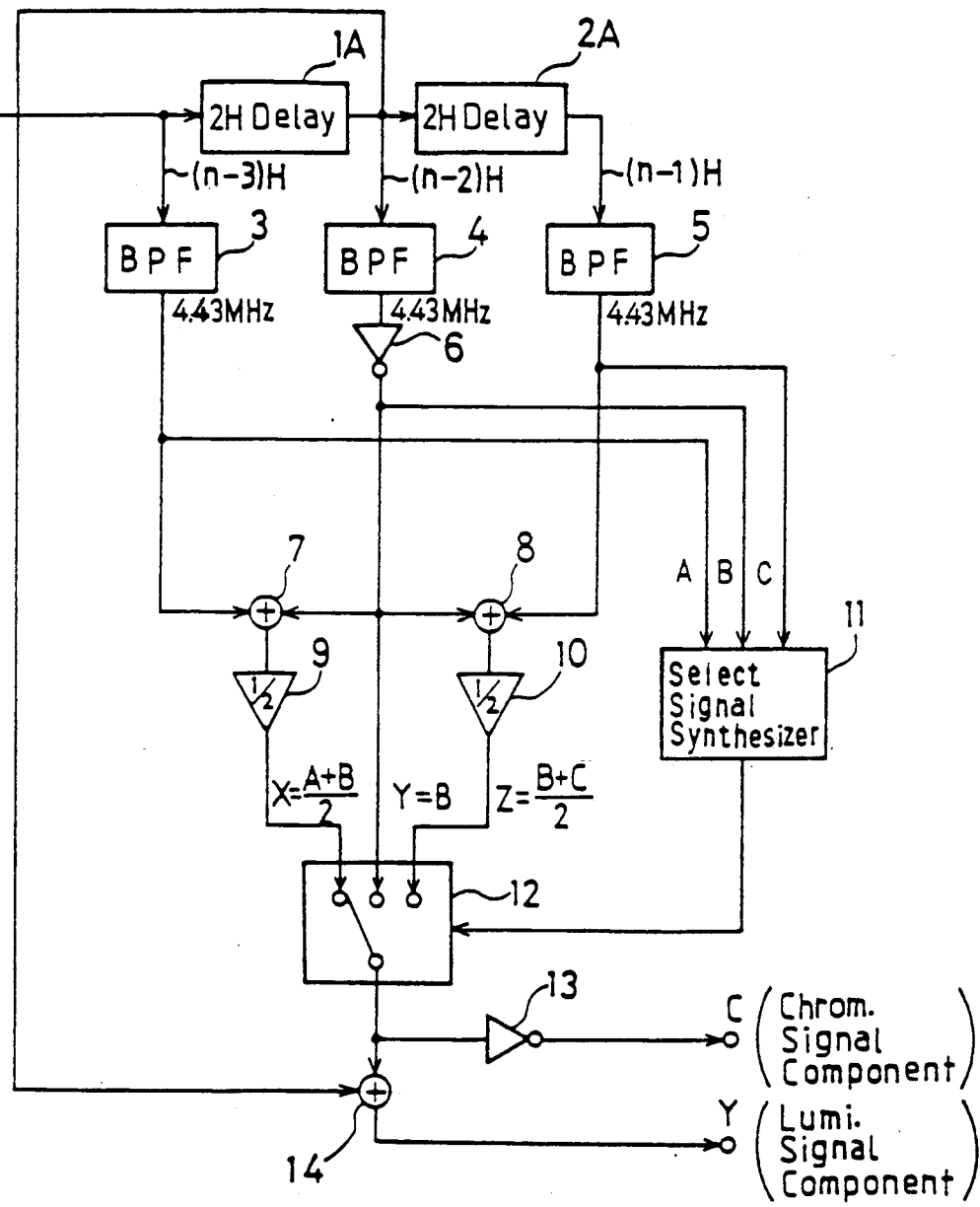

VIDEO SIGNAL PROCESSING APPARATUS

BACKGROUND OF THE INVENTION

1. Field of the Invention

The present invention generally relates to a video signal processing circuit applicable in a luminance-chrominance signal separator for separating a composite color video signal, such as used in a magnetic tape recording and/or reproducing apparatus, into a luminance signal and a chrominance signal and, more particularly, to the video signal processing circuit effective to provide a chrominance signal substantially free from a color displacement in a vertical direction.

2. Description of the Prior Art

In discussing the prior art to the present invention, reference will now be made to a luminance-chrominance signal separator used in a reproducing system of the magnetic tape recording and/or reproducing apparatus, which apparatus is hereinafter referred to as a video tape recorder.

FIG. 8 of the accompanying drawings illustrates a block circuit diagram of the prior art luminance-chrominance signal separating circuit disclosed in a Japanese book entitled "Digital Signal Processing of Images", pages 109 to 110, authored by Takahiko Fukinuke and published from Nikkan Kogyo Newspapers Publishing Co., Ltd. Referring to FIG. 8, the luminance-chrominance signal separating circuit shown therein comprises a 1H delay circuit having a delay time equal to one horizontal scanning period, bandpass filters 3 and 4 for passing a chrominance signal of predetermined bandwidth, a first subtractor 24, an amplifier 9 having a ½ gain and a second subtractor 25.

The luminance-chrominance signal separating circuitt of the construction shown in FIG. 8 operates in the following manner. Let it be assumed that a composite color video signal inputted is of a type containing, as shown in FIGS. 10(a) to 10(d), red color signal components until (n−2)H line and containing no color signal subsequent to the (n−1)H line, that is, of a type representing, as shown in FIG. 11(a), a color picture having a division of red and white portions. Since the carrier wave frequency of the chrominance signal is chosen to be a frequency that is inverted for each line, the chrominance signals have their phase displaced 180° from each other as shown in FIGS. 10(a) and 10(b). Assuming that the composite color video signal inputted at the timing of (n−2)H as shown in FIG. 10(a) is being processed to separate it into the luminance signal and the chrominance signal, the composite color video signal inputted to the 1H delay circuit 1 shown in FIG. 8 at the timing of (n−2)H is delayed a predetermined time equal to one horizontal scanning period (1H) to provide a composite color video signal for (n−3)H line (i.e., having the same phase as shown in FIG. 10(a)) which is subsequently inputted to the bandpass filter 4. The bandpass filter 4 then outputs a chrominance signal component of (n−3)H line. On the other hand, the composite color video signal of (n−2)H is inputted to the bandpass filter 3 from which a chrominance signal component of (n−2)H is outputted. The subtractor 24 performs a subtraction of [(n−2)H−(n−3)H] and subsequently outputs a difference signal descriptive of a result of the subtraction which is then amplified by the amplifier 9 by a gain of ½. The amplifier 9 then outputs a chromi-nance signal component of (n−2)H as shown in FIG. 10(j).

On the other hand, the subtractor 25 subtracts the chrominance signal component of (n−2)H from the composite color video signal of (n−2)H, thereby outputting a luminance signal component of (n−2)H as shown in FIG. 10(f). Thus, the composite color video signal of (n−2)H as shown in FIG. 10(b) is separated into the luminance signal component of (n−2)H as shown in FIG. 10(f) and the chrominance signal component of (n−2)H as shown in FIG. 10(j). Similarly, the composite color video signal containing the red chrominance signal as shown in FIG. 10(a) is separated into the luminance signal component of (n−3)H as shown in FIG. 10(e) and the chrominance signal component of (n−3)H as shown in FIG. 10(i).

The composite color video signal of (n−1)H as shown in FIG. 10(c) is Similarly arithmetically processed with the composite color video signal of (n−2)H which has been delayed a 1H period so that it can be separated into the luminance signal component of (n−1)H as shown in FIG. 10(g) and the chrominance signal component of (n−1)H as shown in FIG. 10(k), and the composite color video signal of nH as shown in FIG. 10(d) is similarly arithmetically processed with the composite color video signal of (n−1)H as shown in FIG. 10(c) and the composite color video signal of (n−1)H, which has been delayed a 1H period so that it can be separated into the luminance signal component of nH as shown in FIG. 10(h) and the chrominance signal component of nH as shown in FIG. 10(l).

The frequency characteristics of the prior art separating circuit of the type referred to above will now be described.

The transfer function Hc of the chrominance signal path within the bandwidth of each of the bandpass filters 3 and 4 and the transfer function H, of the luminance signal path within the bandwidth of each of the bandpass filters 3 and 4 can be expressed by the following equations.

$$H_c = (1 - Z^{-1})/2$$

$$H_Y = (1 + Z^{-1})/2$$

Since $Z^{-1} = -^{jwt}$ wherein T represents one horizontal scanning period, the transfer function $H_Y$ can be rewritten as follows.

$$H_Y = [(1 + \cos\omega T)/2] - (\sin\omega T) \cdot j/2$$

The gain frequency characteristic $|H_Y|$ can be expressed by the following equation.

$$|H_Y| = \sqrt{2 + 2\cos\omega T/2}$$

The gain frequency characteristic $|H_Y|$ attains a maximum value when $\omega = 2n\pi/T$ and a minimum value when $\omega = (2n+1)\pi/T$, wherein n represents an integer. Therefore, the prior art separating circuit shown in FIG. 8 has such a combshaped characteristic that it attains the maximum and minimum values at a cycle of 1/T within the bandwidth of each of the bandpass filters 3 and 4 and that no chrominance signal component will not be outputted outside the bandwidth of each of the bandpass filters 3 and 4 and, therefore, the transfer function Hy of the luminance signal component will be 1, and the overall frequency characteristic thereof will be such as shown in FIG. 9.

However, where the separating circuit is so constructed as shown in FIG. 8, and in the event that the color of the composite signal in the vertical direction varies steeply as shown in FIG. 11(a), such a phenomenon in which the chrominance signal displaces by 1H line as shown in FIG. 11(b) by the following reason. This can readily be understood when the separation of the composite signal of (n−1)H into the luminance signal and the chrominance signal is taken into consideration.

Since an output from the subtractor 24 generated at a timing of (n−1) corresponds to the chrominance signal component (as shown in FIG. 10(j)) of (n−2)H from which the chrominance signal component (zero) of (n−1)H has been subtracted, an output from the ½ amplifier 9 is in a phase opposite to that of the chrominance signal component of (n−2)H, as shown in FIG. 10(k) and represents the chrominance signal component whose level is ½ of the chrominance signal component of (n−2)H, and is outputted as the chrominance signal component of (n−1)H. On the other hand, the luminance signal component of (n−1)H is outputted as a luminance signal component of (n−1)H as shown in FIG. 10(g).

Thus, the chrominance signal having an amplitude corresponding to ½ of the chrominance signal component of composite signal of (n−2)H line preceding 1H period is outputted to a (n−1)H line in which no chrominance signal exists originally and, as shown in FIG. 11(b), at the point at which a red portion changes to a white portion, a line colored red in one line is reproduced.

In a video tape recording and/or reproducing apparatus, or a video tape player, for home use, the signal is passed a number of times through the luminance-chrominance separating circuit, a line correlation noise cancelling circuit having a structure similar thereto and a chrominance signal cross-talk cancelling circuit and, therefore, a problem has been found existing in that a color displacement corresponding to several lines tends to occur.

In recent years, the horizontal resolution of the video tape player has been satisfactorily improved to provide a high quality image reproduction, however, the vertical resolution thereof tends to pose a problem to the accomplishment of the high quality image reproduction because of the previously discussed phenomenon.

On the other hand, the U.S. Pat. No. 4,789,890, issued Dec. 6, 1988, and the U.S. Pat. No. 4,141,035, issued Feb. 20, 1979, to Maxemchuk et al. disclose a composite video signal separating system wherein the vertical filter and the horizontal filter are selectively brought into operation to accomplish the separation of the composite video signal into the luminance signal and the chrominance signal. The Japanese laid-open Patent Publication No. 58-129890, published Aug. 3, 1983, discloses a system wherein the relationship between horizontal, vertical and oblique correlations are detected by the use of a chrominance signal separating filter. The U.S. Pat. No. 4,489,346, issued Dec. 18, 1984 to Tanaka et al. discloses the separation of the composite video signal into the chrominance and luminance signal components by converting data classified in a pattern space.

Although the technique disclosed in any one of the above discussed prior art references appears effective to minimize the color displacement to some extent, it requires a complicated and expensive construction to accomplish the separation of the composite video signal into the chrominance and luminance signal components.

SUMMARY OF THE INVENTION

Accordingly, the present invention has been devised with a view to substantially eliminating the above discussed problems inherent in the prior art systems of separating the composite video signal into the chrominance signal and the luminance signal and has for its essential object to provide an improved video signal processing circuit effective to substantially avoid any possible deviation in the signal such as, for example, the color displacement, which circuit can be fabricated in a compact size.

In order to accomplish the above described object of the present invention, the latter provides a luminance-chrominance signal separating circuit which is featured in the provision of synthesizing means for synthesizing three signals delayed a unitary time with respect to each other, a detecting means for detecting correlations of these three signals, and an output means for selecting and outputting, on the basis of a result of detection of the correlations, two signals each indicative of an average value of the signals neighboring in terms of time and a signal which may exist intermediate the length of time.

According to the present invention, the correlation detecting means used therein is operable to detect two of the three signals delayed a predetermined time T from each other, which have a closer correlation with each other. The output signal selecting means is operable in response to the result of detection performed by the correlation detecting means to output the signal indicative of the average value of these two signals having the closer correlation with each other, or the signal existing at the center of the length of time between these two signals when they have no closer correlation with each other. Therefore, with the video signal processing circuit of the present invention, it is possible to perform the signal processing which does not result in the color displacement. Also, since the video signal processing circuit of the present invention does require the use of neither a number of filters nor a data converting means for the pattern space and, therefore, can be manufactured compact.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views, and:

FIG. 12 is a block circuit diagram showing the separating circuit according to a third preferred embodiment of the present invention, which circuit is particularly suited for use in connection with the PAL system.

DETAILED DESCRIPTION OF THE EMBODIMENTS

Figure 1:
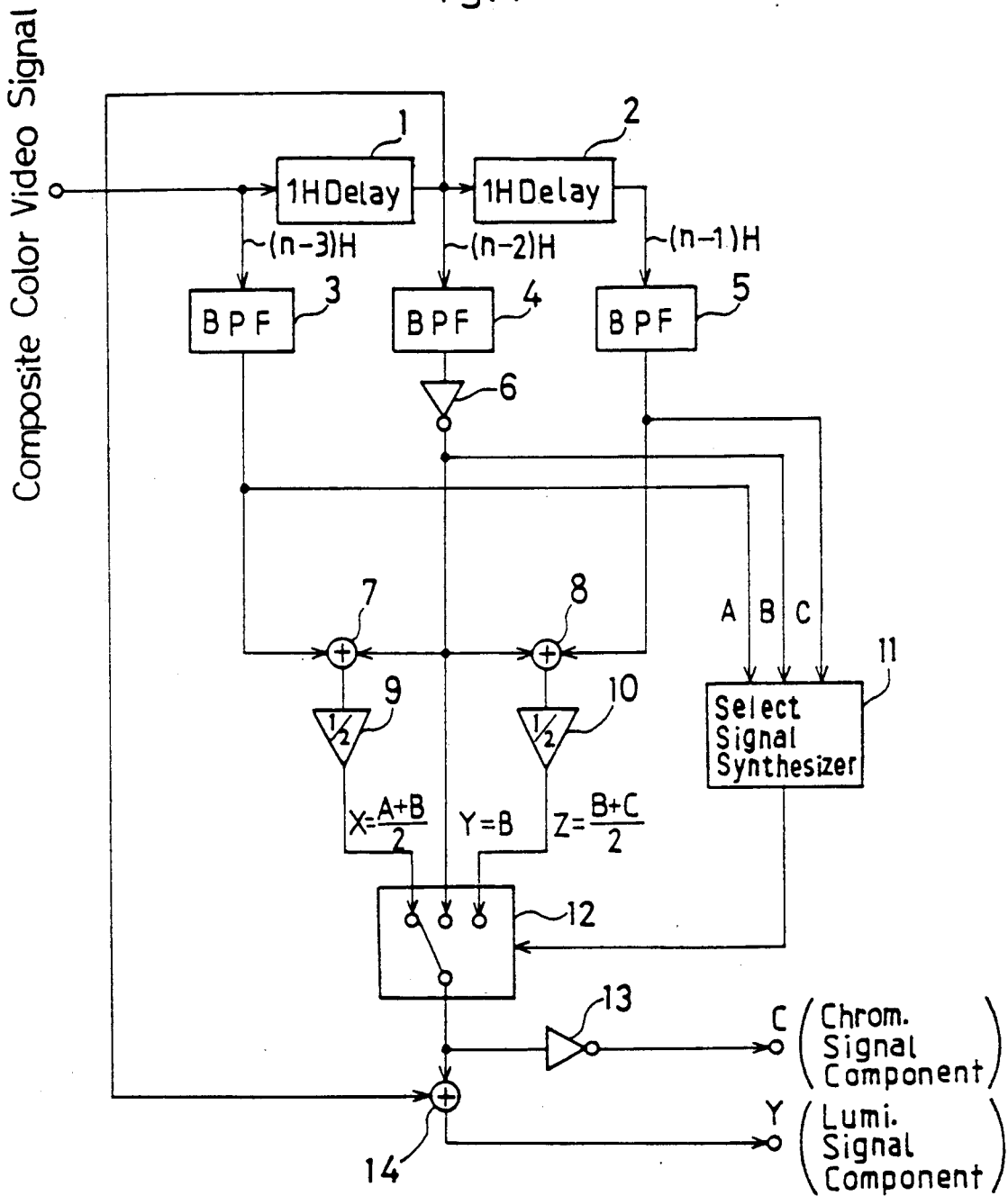
FIG. 1 is a block circuit diagram showing a luminance-chrominance signal separating circuit according to a first preferred embodiment of the present invention.

Referring first to FIGS. to 7, there is shown a chrominance-luminance signal separating circuit according to a first preferred embodiment of the present invention which is particularly applicable to a color television receiver set operating according to the NTSC system. As best shown therein, the separating circuit comprises series-connected 1H delay circuits 1 and 2, parallel-connected bandpass filters 3, 4 and 5 each operable to remove a low frequency component from an input signal, reversible amplifiers 6 and 13 each having a gain of $-1$, adders 7, 8 and 9, ½ amplifiers 9 and 10 each having a gain of ½, a selector 12 adapted to receive three inputs X, Y and Z and then to select one of these inputs X, Y and Z for outputting, and a select signal synthesizing circuit 11 for determining a correlation of signals A, B and C inputted thereto for providing a select signal to be applied to the selector 12.

Figure 2:
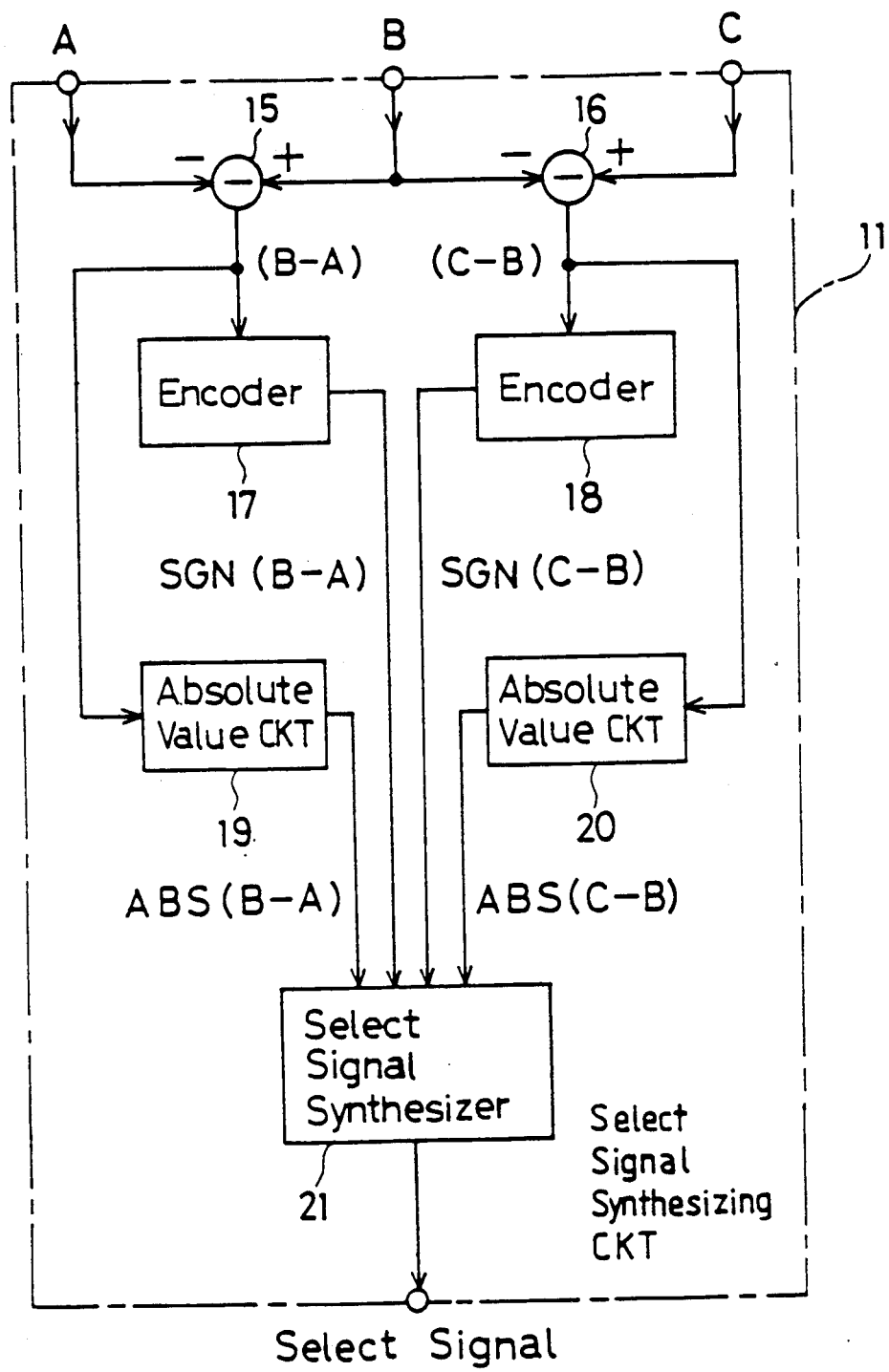
FIG. 2 is a block circuit diagram showing a control signal synthesizing circuit employed in the separating circuit of FIG. 1.
Figure 3:
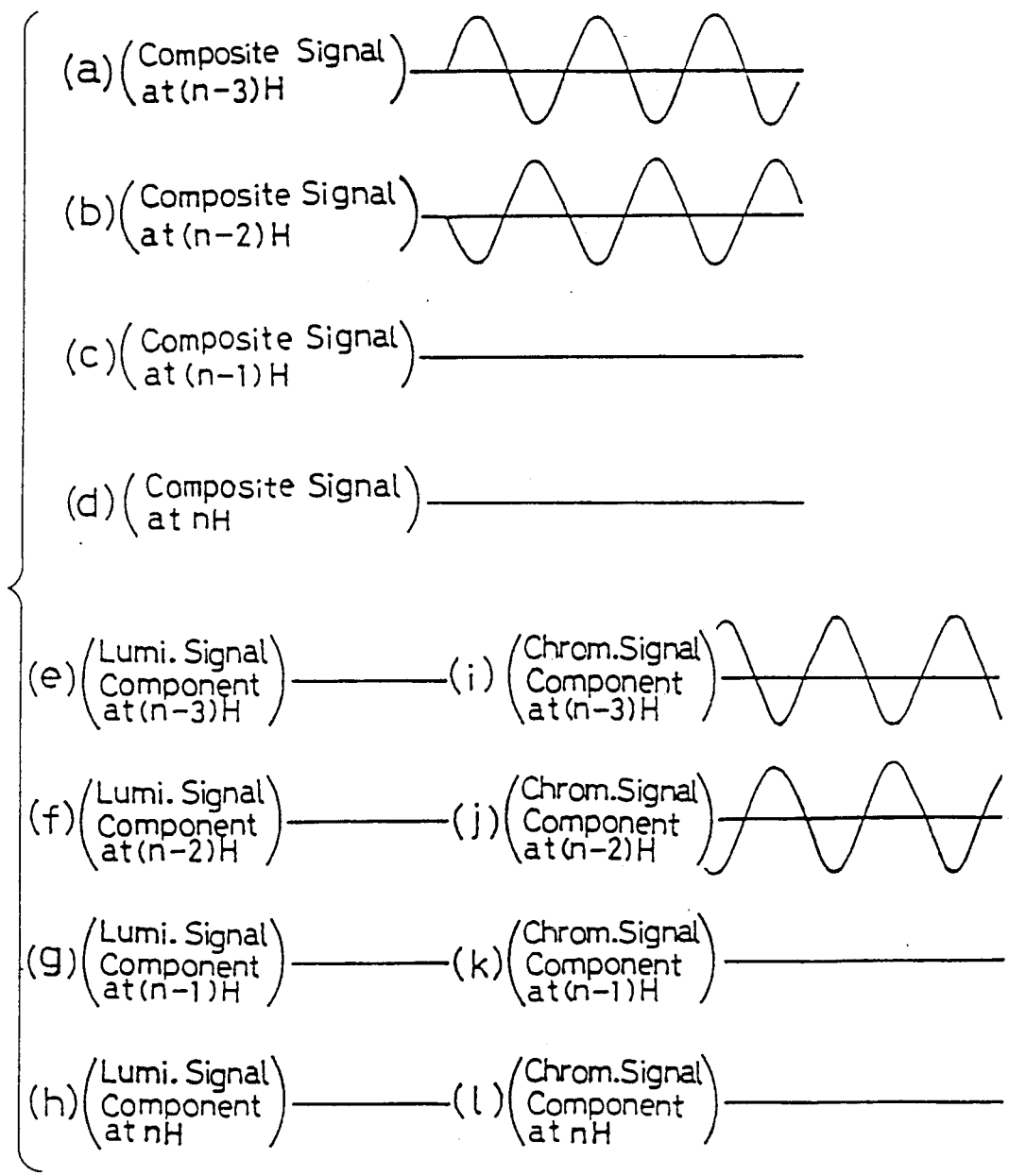
FIG. 3 is a diagram showing waveforms of input signals and those of a luminance signal and a chrominance signal separated according to the present invention.

The details of the select signal synthesizing circuit 11 are shown in FIG. 2 in a block circuit representation. As shown therein, the select signal synthesizing circuit 11 comprises subtractors 15 and 6, encoders 17 and 18 adapted to receive respective input signals from the associated subtractors 15 and 16 for the determination of the sign (either positive or negative) of the respective input signals and to output respective signals indicative of the sign of the associated input signals, absolute value circuits 19 and 20 for outputting respective signals indicative of the absolute values ABS of signals inputted thereto, and a select signal synthesizer 21 operable to determine a line correlation in reference to respective output signals from the encoders 17 and 1 and the absolute value circuits 19 and 20 for the formulation of a select signal to be applied to the selector 12.

The select signal synthesizer 21 is constituted by a logic circuit designed to synthesize a select signal necessary to select one of the input signals X, Y and Z to the selector 12, that is, the input signal Y, provided that the output SGN(B-A) from the encoder 17 and the output SGN(C-B) from the encoder 18 exhibit identical signs; to synthesize a select signal necessary to select the input signal X, provided that the respective outputs from the encoders 17 and 18 exhibit different signs and that an output ABS(B-A) from the absolute value circuit 19 is lower than an output ABS(C-B) from the absolute value circuit 20; and to synthesize a select signal necessary to select the input signal Z, provided that the respective outputs from the encoders 17 and 18 exhibit different signs and that the output from the absolute value circuit 20 is lower than the output from the absolute value circuit 19.

Hereinafter, the operation of the separating circuit will be described.

Let it be assumed that composite signals shown in FIGS. 3(a), 3(b), 3(c) and 3(d) similar to the composite signals shown in FIGS. 10(a), 10(b), 10(c) and 10(d), respectively, are inputted.

In the first place, the separation of the composite signal of (n−2)H line into the luminance signal and the chrominance signal will be described. In the illustrated embodiment, since the correlation before and after 1H is detected, signals of respective (n−3)H and (n−1)H lines are required. These signals can be prepared by the 1H delay circuits 1 and 2 and, although low frequency components of the signals of respective (n−1)H, (n−2)H and (n−3)H lines are removed by the associated bandpass filters 3, 4 and 5, respective waveforms of the output signals A, B and C do not vary since these signals have no low frequency component and represent such respective waveforms as shown in FIGS. 4(a), 4(b) and 4(c).

The adder 7 outputs a signal indicative of a summed value of (A+B) and the ½ amplifier 9 outputs a signal indicative of X=(A+B)/2. The adder 8 outputs a signal indicative of a summed value of (B+C) and the ½ amplifier 10 outputs a signal indicative of Z=(B+C)/2. Three signals X, Y=B and Z are inputted to the selector 12. Respective waveforms of these signals X, Y and Z are shown in FIGS. 4(f), (g) and (h).

Figure 4:
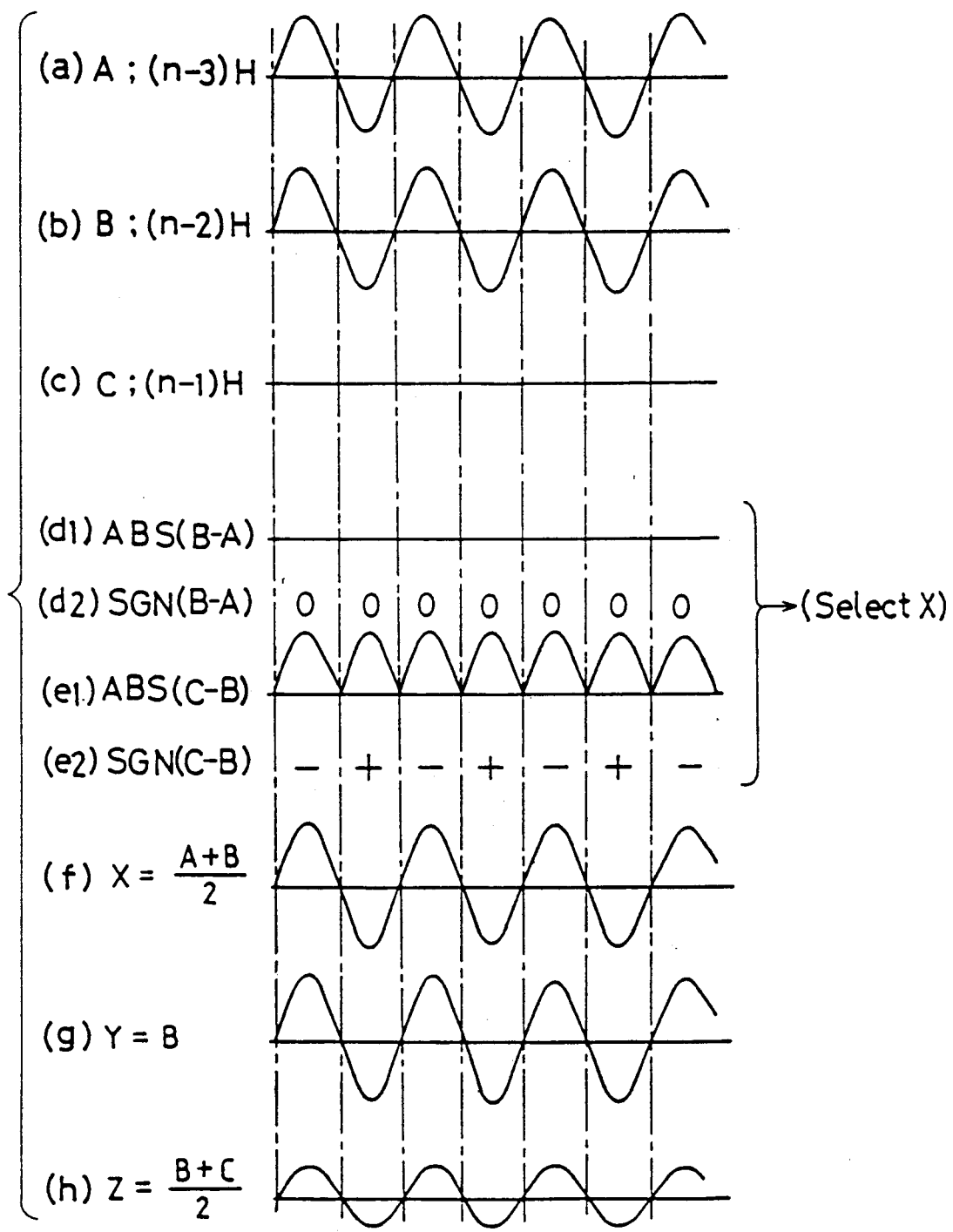
FIGS. 4 and 5 are diagrams showing various waveforms used to explain the process of synthesizing a selection signal in the control signal synthesizing circuit of FIG. 2.

Then, the subtractor 15 of the select signal synthesizing circuit 11 performs a subtraction of (B−A), the absolute value circuit 19 outputs an absolute value ABS(B−A) of (B−A), and the encoder 17 outputs an encoded data SGN(B−A) representative of the positive or negative sign of the subtracted value (B−A). The output ABS(B−A) in this case exhibits such a waveform as shown in FIG. 4(d1) wherein the chrominance signal component is zero and the encoded data SGN(B−A) is zero at all time.

On the other hand, the subtractor 16 performs a subtraction of (C−B), the absolute value circuit 20 outputs an absolute value ABS(C−B) of (C−B), and the encoder 18 outputs an encoded data SGN(C−B). The output ABS(C−B) in this case exhibits a chrominance signal of such a waveform as shown in FIG. 4(e1), and the encoded data SGN(C−B) alternately takes positive and negative signs for each ½ cycle as shown in FIG. 4(e2).

As hereinbefore described, the select signal synthesizer 21 operates:

(1) to select the signal Y=B when SGN(B−A)=SGN(C−B),
(2) to select the signal x=(B+A)/2 when SGB(B−A)≠SGN(C−B) and ABS(B−A)<ABS(C−B), and
(3) to select the signal Z=(B+C)/2 when SGN(B−A)≠SGN(C−B) and ABS(B−A)≧ABS(C−B).

In other words, the select signal synthesizer 21 selects one of the signals which exhibits the smallest difference, that is, one of the signals which exhibits the strongest line correlation. In such case, as can be understood from FIGS. 4(d1), (d2), (e1) and (e2), the condition (2) referred to above applies and, therefore, the signal for the selection of X is synthesized and the selector 12 therefore outputs the signal X.

The signal X is subsequently supplied to the inverting amplifier 13 b which the phase of the signal X is reversed to provide the chrominance signal component of (n−2)H (as shown in FIG. 3(J)), said chrominance signal component being outputted from the inverting amplifier 13.

On the other hand, the adder 14 performs a summation of the chrominance signal component of (n−2)H having a phase opposite to the composite signal of (n−2)H and subsequently outputs the luminance signal component of (n−2)H as shown in FIG. 3(f).

The separation of the composite signal of (n−1)H as shown in FIG. 3(c) into the luminance signal and the chrominance signal will now be described.

Figure 5:
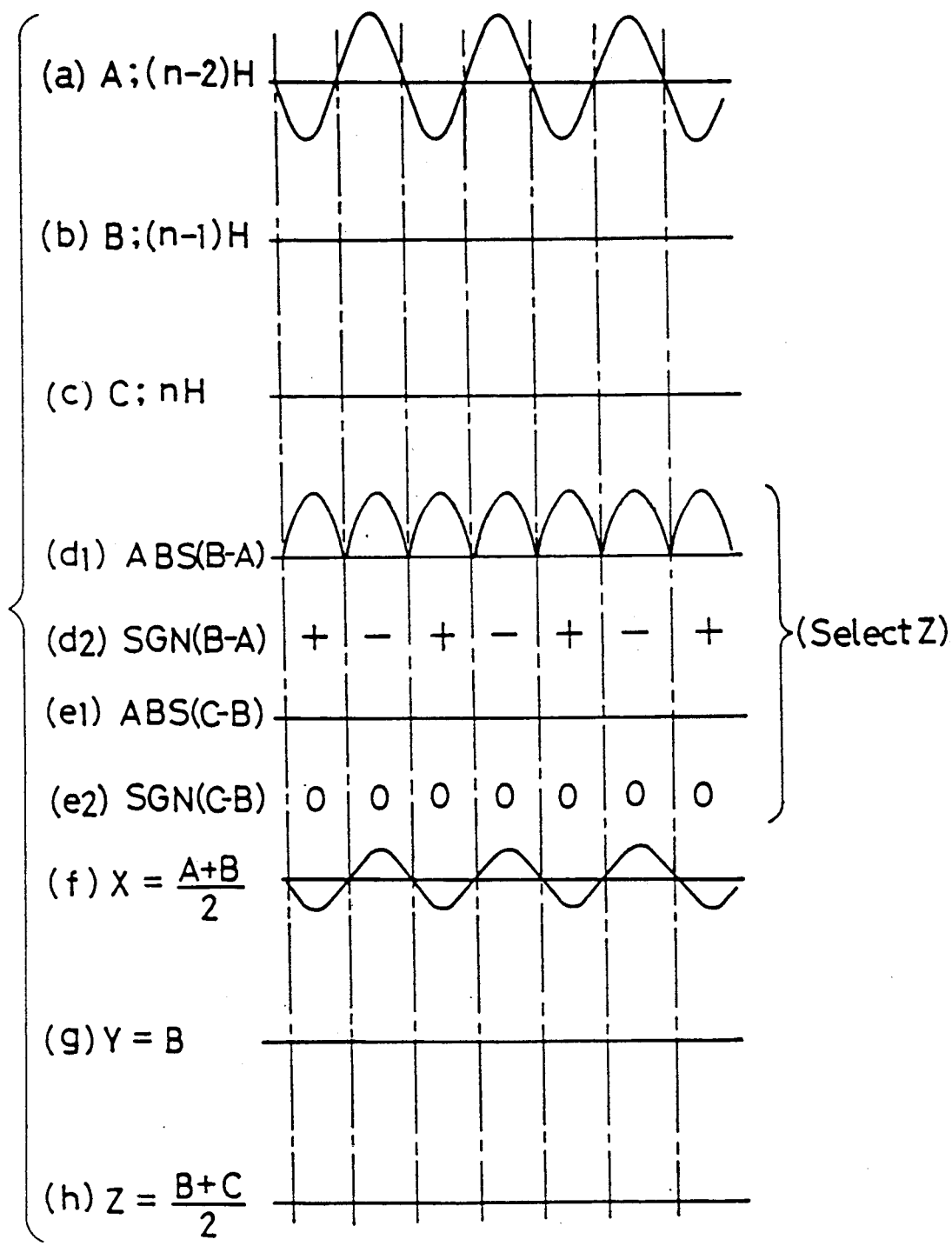

In this case the signals A, B and C exhibit such respective waveforms as shown in FIGS. 5(a), 5(b) and 5(c) whereas the signals X, Y and Z exhibit such respective waveforms as shown in FIGS. 5(f), 5(g) and 5(h). The absolute value circuit 19 generates an output ABS(B−A) of a waveform as shown in FIG. 5(d1); the encoder 17 outputs an output data ABS(C−B) of a waveform as shown in FIG. 5(d2); the absolute value circuit 20 outputs an output ABS(C−B) of a waveform as shown in FIG. 5(e1); and the encoder 18 outputs an output data SGN(C−B) of a waveform as shown in FIG. 5(e2).

In this case, since the condition (3) applies, the selector 12 selects the signal Z for outputting and, as the chrominance signal component of (n−1)H and the luminance signal component of (n−1)H, signals shown in FIG. 3(k) and in FIG. 3(g) are outputted, respectively, with the chrominance signal component being zeroed.

Figure 6A:
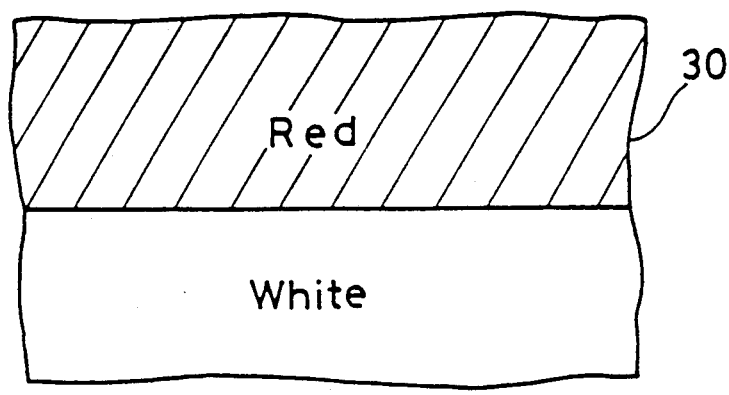
FIG. 6 is a schematic diagram showing the relationship between a video input and a video output after the separation of the luminance and chrominance signals.
Figure 6B:
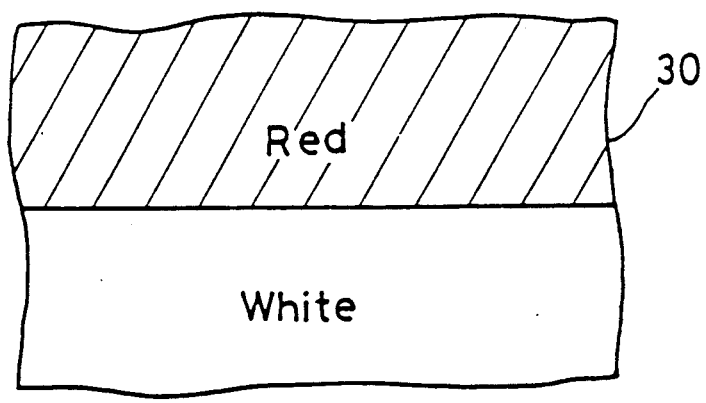

Thus, according to the separating circuit in the illustrated embodiment, the composite signals on the lines shown in FIGS. 3(a), 3(b), 3(c) and 3(d), respectively, can be separated into the respective luminance signal components as shown in FIGS. 3(e), 3(f), 3(g) and 3(h) and the respective chrominance signal components as shown in FIGS. 3(i), 3(j), (k) and 3(l). Accordingly, the picture 30 having upper and lower portions represented by red and white colors, respectively, as shown in FIG. 6(a) can be separated as shown in FIG. 6(b) without accompanying a color displacement.

The absolute value circuits 19 and 20 employed in the above described embodiment are used as respective circuits operable to synthesize data necessary to detect the line correlations, which data are utilized by the select signal synthesizer 21 to control the selector 12 for the selection of one of the previously described conditions (1) to (3). The selection of one of the signals which exhibits the smallest difference by means of the selector 12 means that a signal component which exhibits the strongest line correlation is outputted.

Where the selector 12 selects the signal Y, it is the case in which the line correlation is small. In the case where the line correlation is small, no calculation is made between the lines and therefore, no deterioration occur in the vertical resolution.

Also, although the each of the encoders 19 and 20 has been described as operable to determine one of the negative sign, zero and the positive sign, it may be the one operable to determine one of the negative sign and the positive sign.

In addition, while in the foregoing embodiment the detection has been made of the correlation during the 1H period, arrangement may be made to detect the correlation during a predetermined period within 1H period, during the nH period, during n-field interval, or during the interval between n-frames so that the signal can be selected.

The foregoing embodiment is of a type capable of satisfying the following output characteristic:

$$\text{Output} = \begin{cases} Y = B: SGN(B - A) = SGN(C - B) \\ X = \dfrac{B + A}{2} : \begin{pmatrix} SGN(B - A) \neq SGN(C - B) \\ ABS(B - A) < ABS(C - B) \end{pmatrix} \\ Z = \dfrac{B + C}{2} : \begin{pmatrix} SGN(B - A) \neq SGN(C - B) \\ ABS(B - A) \geq ABS(C - B) \end{pmatrix} \end{cases}$$

However, of the conditions in the above equation, ABS(B−A)≧ABS(C−B) may be replaced with ABS(B−A)>ABS(C−B) and, in such case, ABS(B−A)<ABS(C−B) in the above equation will become ABS(B−A)≦ABS(C−B).

Considering the inverters 6 and 13 and the adder 14, the above equation descriptive of the output characteristic can be rewritten as follow.

$$R(i) =$$

$$\begin{cases} S(i); \text{When } SGN\{S(i) + S(i - T)\} \neq SGN\{S(i + T) + S(i)\} \\ \dfrac{S(i) - S(i + T)}{2} ; \begin{pmatrix} \text{When } SGN\{S(i) + S(i - T)\} = \\ SGN\{S(i + T) + S(i)\} \\ \text{and} \\ ABS\{S(i) + S(i - T)\} > \\ ABS\{S(i + T) + S(i)\} \end{pmatrix} \\ \dfrac{S(i) - S(i - T)}{2} ; \begin{pmatrix} \text{When } SGN\{S(i) + S(i - T)\} = \\ SGN\{S(i + T) + S(i)\} \\ \text{and} \\ ABS\{S(i) + S(i - T)\} \leq \\ ABS\{S(i + T) + S(i)\} \end{pmatrix} \end{cases}$$

wherein:

S(i): Signal appearing at the timing i and from which the low frequency component has been removed;

SGN: Function of outputting the positive and negative signs;

ABS: Function of outputting the absolute value;

R(i): Output signal appearing at the timing i; and
T: Unitary delay time.

Needless to say, the above equation can be rewritten as follows.

$$R(i) = \begin{cases} S(i); & \text{When } -SGN\{S(i) + S(i - T)\} = SGN\{S(i + T) + S(i)\} \\ \dfrac{S(i) - S(i + T)}{2}; & \begin{cases} \text{When } -SGN\{S(i) + S(i - T)\} \neq SGN\{S(i + T) + S(i)\} \\ \text{and} \\ ABS\{S(i) + S(i - T)\} > ABS\{S(i + T) + S(i)\} \end{cases} \\ \dfrac{S(i) - S(i - T)}{2}; & \begin{cases} \text{When } -SGN\{S(i) + S(i - T)\} \neq SGN\{S(i - T) + S(i)\} \\ \text{and} \\ ABS\{S(i) + S(i - T)\} \leq ABS\{S(i + T) + S(i)\} \end{cases} \end{cases}$$

Of the conditions in the above equation, $ABS\{S(i)+S(i-T)\} \leq ABS\{S(i+T)+S(i)\}$ may be replaced with $ABS\{S(i)+S(i-T)\} < ABS\{S(i+T)+S(i)\}$ and, in such case, $ABS\{S(i)+S(i-T)\} > ABS\{S(i+T)+S(i)\}$ will become $ABS\{S(i)+S(i-T)\} \geq ABS\{S(i+T)+S(i)\}$.

Figure 7:
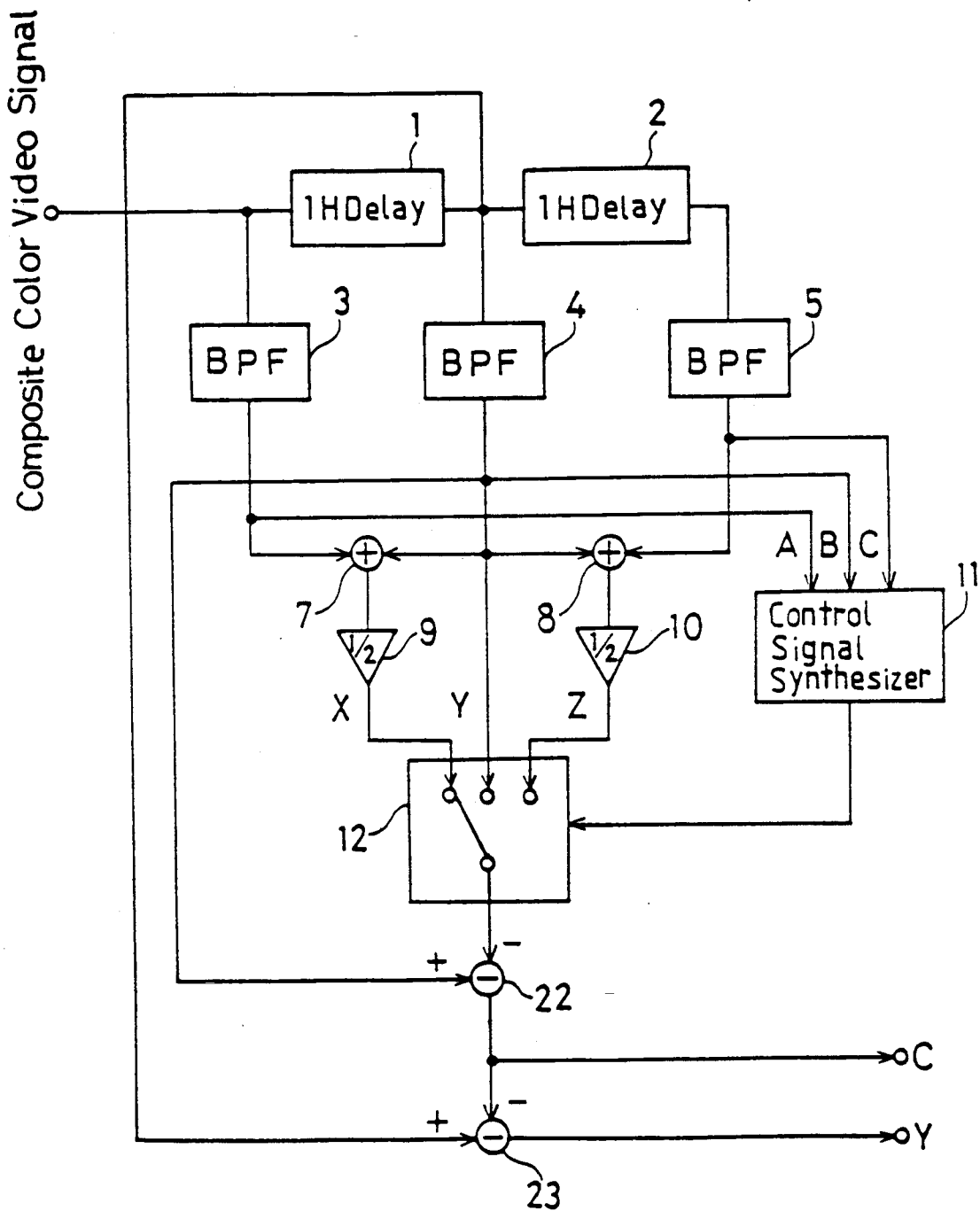
FIG. 7 is a block circuit diagram showing the separating circuit according to a second preferred embodiment of the present invention.
Figure 8:
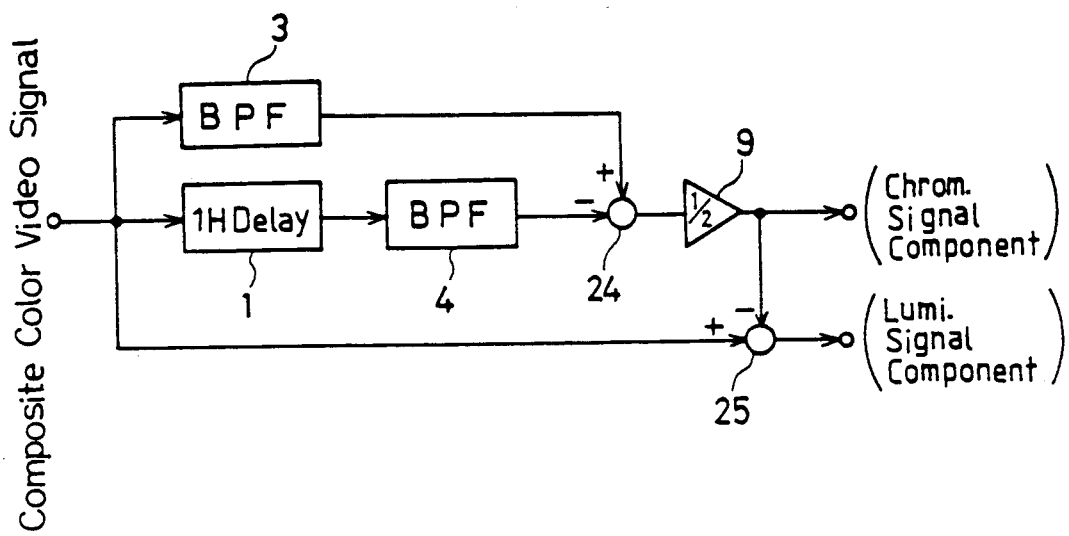
FIG. 8 is a block circuit diagram showing the prior art luminance-chrominance signal separating circuit.
Figure 9:
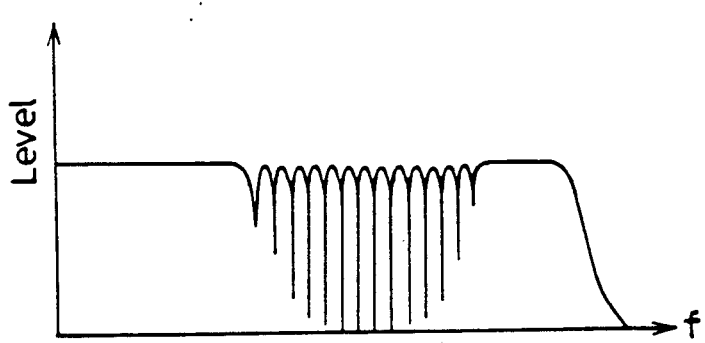
FIG. 9 is a diagram showing the gain-frequency characteristic of the luminance signal separated by the prior art separating circuit of FIG. 8.
Figure 10:
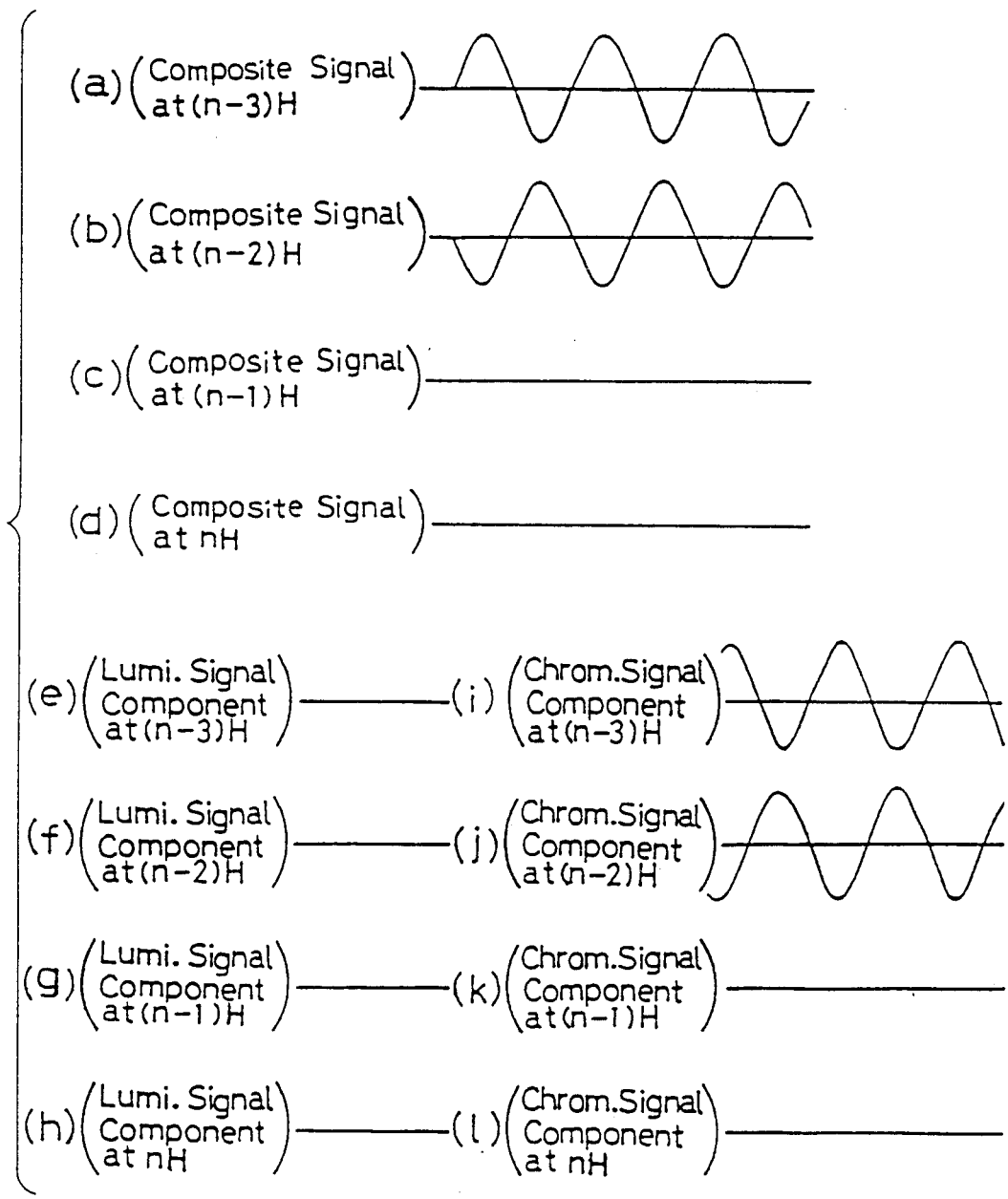
FIG. 10 is a diagram showing various waveforms of input signals and the luminance and chrominance signals separated by the prior separating circuit of FIG. 8, which diagram is used to explain the operation of the prior art separating circuit., FIGA. 11A and 11B are schematic diagrams showing the relationship between a video input and a video output after the separation of the luminance and chrominance signals in the prior art separating circuit.
Figure 11A:
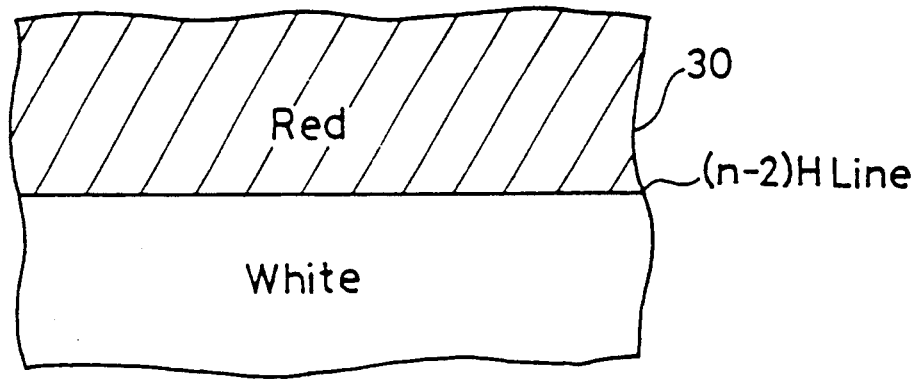
Figure 11B:
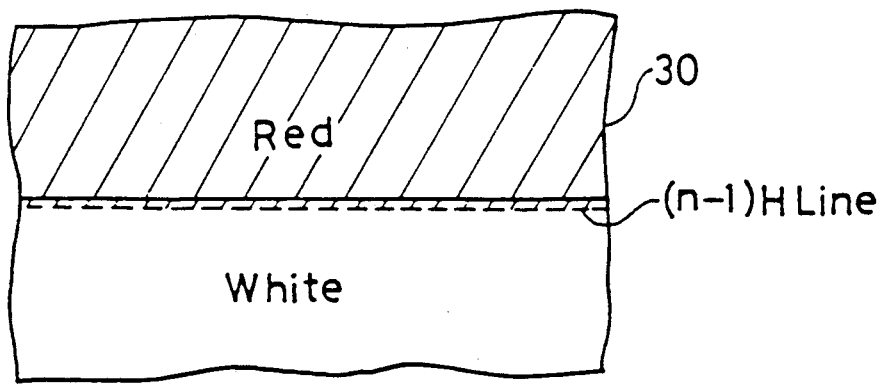

FIG. 7 illustrates a block circuit diagram of the separating circuit according to another embodiment of the present invention, which is similar to that shown in FIG. 1 except that the inverters 6 and 13 and the adder 14 shown in FIG. 1 have been dispensed with and, instead, subtractors 22 and 23 are employed. Even this embodiment of FIG. 7 can function in a manner similar to the foregoing embodiment shown in and described with particular reference to FIGS. 1 to 5.

Figure 13:
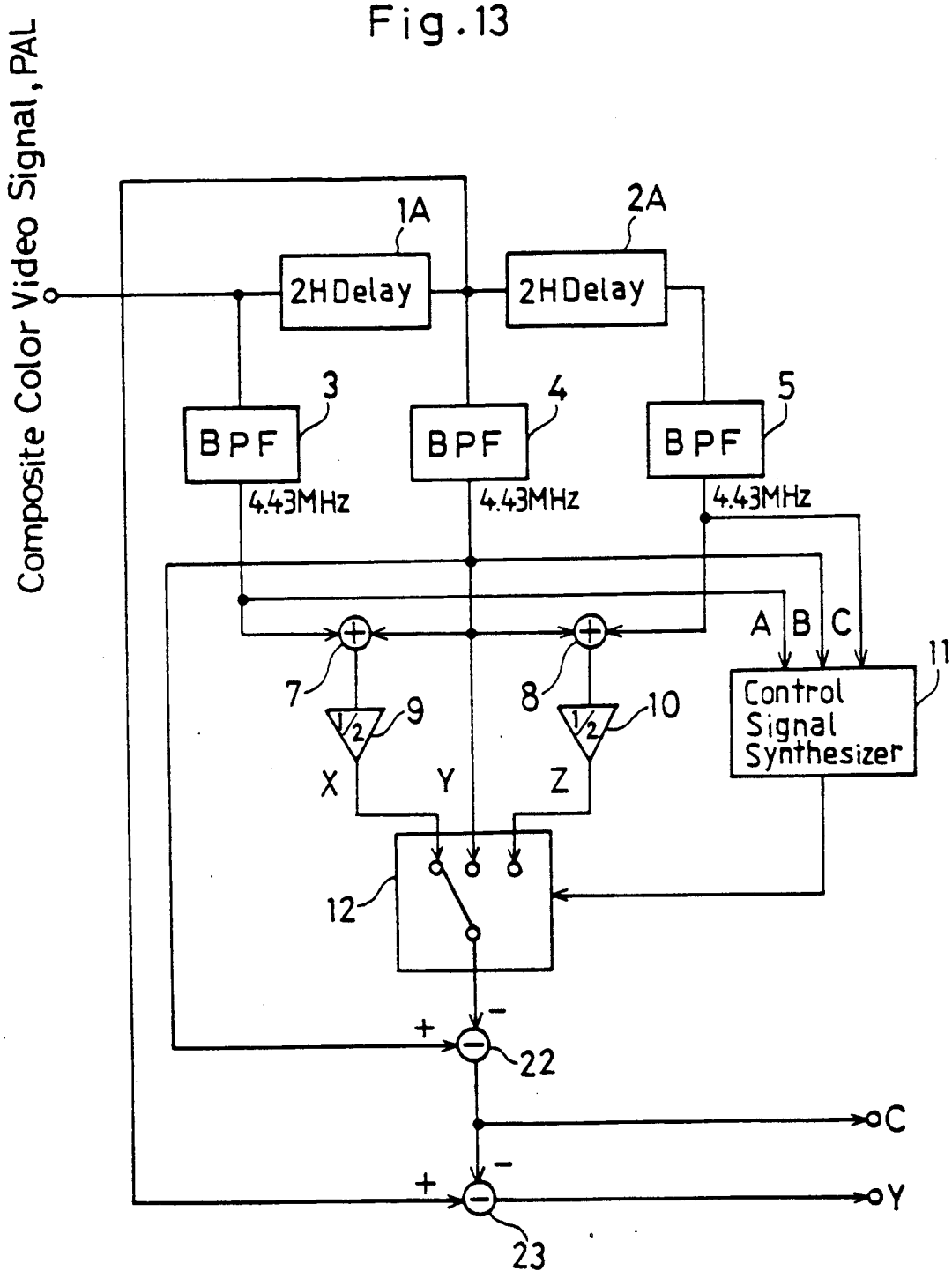
FIG. 13 is a block circuit diagram showing the separating circuit according to a fourth preferred embodiment of the present invention, which circuit is particularly suited for use in connection with the PAL system.

In describing the foregoing embodiments of the present invention, it has been described that the 1H delay circuits may be constituted by a nH delay circuit. However, since the chrominance signal modulation system according to the PAL Television system exhibits a high correlation for each 2H, it is recommended to use 2H delay circuits, rather than the 1H delay circuits, for the separation of the composite signal into the luminance and chrominance signals. For this reason, in the PAL Television system, the 1H delay circuits shown in FIG. 1 have to be replaced with the 2H delay circuits. In such case, while the bandwidth of the bandpass filter is 3.58 MHz according to the NTSC Television system, it is recommended that, as far as the chrominance-luminance signal separation according to the PAL Television system is concerned, the bandwidth of the bandpass filter be 4.43 MHz. The separating circuit utilizable in the PAL Television system for the separation of the composite signal into the chrominance and luminance signals is shown in FIG. 12. As shown therein, the circuit shown in FIG. 12 is substantially similar to that shown in FIG. 1 except for the delay circuits IA and 2A. The select signal synthesizing circuit utilizable in the circuit of FIG. 12 may be the one shown in and described with reference to FIG. 2. Also, as shown in FIG. 13, a circuit may be used wherein the 1H delay circuits shown in Pig. 7 is replaced with 2H delay circuits, respectively.

In describing any one of the foregoing embodiments of the present invention, reference has been made to the separating circuit for separating the composite signal into the luminance signal and the chrominance signal. However, the vide signal processing circuit according to the present invention is so designed as to detect the presence or absence of the line correlation for the calculation of the vertical correlation and, therefore, the separating circuit according to the present invention can be used as a line correlation noise canceller or a chrominance signal cross-talk canceller such as generally used in the reproducing signal processing circuit in the video tape player for home use.

As hereinbefore fully described, the present invention is such that three input video signals separated a predetermined time T are extracted and one of these input video signals which is intermediate of the other signals and signals each spaced from this intermediate signal before or after the time T, respectively, are averaged to provide two averaged signals, said intermediate signal or one of said averaged signals which exhibits the strongest line correlation being selected for outputting. Accordingly, the present invention is effective to provide the video signal processing circuit substantially free from the occurrence of any displacement in the output signal. Also, since the use of the plural fillers and the data converting means for the pattern space is not required, the video signal processing circuit can be advantageously simplified.

Although the present invention has been fully described in connection with the preferred embodiments thereof with reference to the accompanying drawings which are used only for the purpose of illustration, those skilled in the art will readily conceive numerous changes and modifications within &.he framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A video signal processing device which comprises:
   a filtering means for removing a low frequency component of an input video signal;
   a delay signal synthesizing means for formulating three signals $S(i-T)$, $S(i)$ and $S(i+T)$ (wherein i represents a current timing) by delaying the signal, whose low frequency component has been removed, at intervals of a unitary time T set in a predetermined period within one horizontal scanning period, n horizontal scanning period (n-representing an integer greater than 1), n-field period or n-frame period;
   a difference signal synthesizing means for formulating signals $\{S(i)-S(i-T)\}/2$ and $\{S(i)-S(i+T)\}/2$;
   an absolute value calculating means for calculating respective absolute values of $\{S(i)+S(i-T)\}$ and $\{S(i+T)+S(i)\}$;
   a sign discriminating means for determining respective signs SGN of $\{S(i)+S(i-T)\}$ and $\{S(i+T)+S(i)\}$;
   a correlation detecting means for determining conditions of the following equations descriptive of output characteristics:

$$R(i) =$$

-continued $$R(i) = \begin{cases} S(i); & \text{When } SGN\{S(i) + S(i-T)\} \neq SGN\{S(i+T) + S(i)\} \\ \dfrac{S(i) - S(i+T)}{2}; & \text{and} \begin{cases} \text{When } SGN\{S(i) + S(i-T)\} = SGN\{S(i+T) + S(i)\} \\ ABS\{S(i) + S(i-T)\} > ABS\{S(i+T) + S(i)\} \end{cases} \\ \dfrac{S(i) - S(i-T)}{2}; & \text{and} \begin{cases} \text{When } SGN\{S(i) + S(i-T)\} = SGN\{S(i+T) + S(i)\} \\ ABS\{S(i) + S(i-T)\} \leq ABS\{S(i+T) + S(i)\} \end{cases} \end{cases}$$

or $$R(i) = \begin{cases} S(i); & \text{When } SGN\{S(i) + S(i-T)\} \neq SGN\{S(i+T) + S(i)\} \\ \dfrac{S(i) - S(i+T)}{2}; & \text{and} \begin{cases} \text{When } SGN\{S(i) + S(i-T)\} = SGN\{S(i+T) + S(i)\} \\ ABS\{S(i) + S(i-T)\} \geq ABS\{S(i+T) + S(i)\} \end{cases} \\ \dfrac{S(i) - S(i-T)}{2}; & \text{and} \begin{cases} \text{When } SGN\{S(i) + S(i-T)\} = SGN\{S(i+T) + S(i)\} \\ ABS\{S(i) + S(i-T)\} < ABS\{S(i+T) + S(i)\} \end{cases} \end{cases}$$

wherein:

$S(i)$: Signal appearing at the timing i and from which the low frequency component has been removed;

SGN: Function of outputting the positive and negative signs;

ABS: Function of outputting the absolute value;

$R(i)$ Output signal appearing at the timing i; and, a selecting means for selecting and outputting an output signal $R(i)$ according to the equations descriptive of the output characteristics and o the basis of a result of detection performed by the correlation detecting means.

2. The signal processing device as claimed in claim 1, wherein said filtering means comprises first to third bandpass filters and said delay signal synthesizing means comprises first and second delay circuits, and wherein said input video signal is supplied to the first delay circuit and the first bandpass filter, an output from the first delay circuit being supplied to the second delay circuit and the second bandpass filter, an output from the second delay circuit being supplied to the third bandpass filter.

3. The signal processing device as claimed in claim 2, further comprising a first inverter for inverting the output from the second bandpass filter, and wherein said difference signal synthesizing means comprises:

a first adder for summing the output from the first bandpass filter and an output from the first inverter;

a second adder for summing the output from the first inverter and an output from the third bandpass filter; and a first ½ calculator for multiplying an output from the first adder by ½; and a second ½ calculator for multiplying an output from the second adder by ½; and wherein said selecting means comprises:

a selector for selectively outputting one of respective outputs from the first inverter, the first ½ calculator and the second ½ calculator in dependence on the result of detection performed by the correlation detecting means;

a second inverter for inverting an output from the selector and outputting it as a chrominance signal; and a third adder for summing respective outputs from the selector and the first delay circuit together to provide a luminance signal.

4. The signal processing device as claimed in claim 2, wherein the difference signal synthesizing means comprises a first adder for summing respective outputs from the first bandpass filter and the second bandpass filter together, a second adder for summing respective outputs from the second bandpass filter and the third bandpass filter together, a first ½ calculator for multiplying an output from the first adder by ½, and a second ½ calculator for multiplying an output from the second adder by ½, and wherein the selecting means comprises a selector for selectively outputting one of respective outputs from the second bandpass filter, the first ½ calculator and the second ½ calculator in dependence on the result of detection performed by the correlation detecting means, a first subtractor for subtracting an output of the selector from the output from the second bandpass filter to provide a chrominance signal, and a second subtractor for subtracting an output of the first subtractor from the output of the first delay circuit to provide a luminance signal.

5. The signal processing device as claimed in claim 2, wherein each of the first and second delay circuits is operable to delay the input video signal a predetermined time equal to one horizontal scanning period.

6. The signal processing device as claimed in claim 2, wherein each of the first and second delay circuit is operable to delay the input video signal a predetermined time equal to two horizontal scanning periods.

* * * * *